LEATHER GRADING DEVICES

Filed Feb. 6, 1959 5 Sheets-Sheet 1

INVENTORS.
MILTON BAILEY
LEAH S. CHUPACK
BY
Louis B. Applebaum
ATTORNEY

INVENTORS.
MILTON BAILEY
LEAH S. CHUPACK
BY
Louis B. Applebaum
ATTORNEY

LEATHER GRADING DEVICES

INVENTORS
MILTON BAILEY
LEAH S. CHUPACK
BY
Louis B. Applebaum
ATTORNEY

INVENTORS.
MILTON BAILEY
LEAH S. CHUPACK
BY
Louis B. Applebaum
ATTORNEY

Dec. 11, 1962 M. BAILEY ET AL 3,067,609

LEATHER GRADING DEVICES

Filed Feb. 6, 1959 5 Sheets-Sheet 5

INVENTORS.
MILTON BAILEY
LEAH S. CHUPACK
BY
Louis B. Applebaum
ATTORNEY

United States Patent Office 3,067,609

Patented Dec. 11, 1962

3,067,609

LEATHER GRADING DEVICES

Milton Bailey, 36 Kenilworth Place, Brooklyn, N.Y., and Leah S. Chupack, 2201 S. Van Ness Ave., Santa Ana, Calif.

Filed Feb. 6, 1959, Ser. No. 791,779

15 Claims. (Cl. 73—100)

(Granted under Title 35, U.S. Code (1952), sec. 266)

The invention described herein may be manufactured and used by or for the Government of the United States of America for governmental purposes without the payment of any royalties thereon or therefor.

The invention relates to devices for grading leathers, and more particularly pertains to devices that facilitate the objective determination of the break characteristics of leathers.

One of the most important characteristics of leather is the property called "break." Break relates to the formation of tiny wrinkles on the grain surface of leather when it is bent inward with a radius of curvature like that formed at the vamp of a shoe in walking. If the wrinkles are minute, the leather is said to have a fine break; if the wrinkles are very large, the leather is considered coarse and is said to have a pipey or coarse break.

Functionally, the serviceability and handsome appearance of the leather depends upon the fineness of its break characteristic. It has frequently been observed by the military that shoes made with pipey leather often split open at the vamp, whereas shoes fabricated from "tight" (fine-break) leather withstand rigorous wear. It thus becomes desirable to be able to grade leathers according to their break characteristics.

Until the introduction of this invention, no satisfactory objective standards or method existed for the grading of leather in accordance with its break characteristic. Leather grades were determined by the subjective opinion of leather experts. However, it has been found that the gradings of any given expert are frequently inconsistent, not only with the gradings of other experts but also with his own work. The need for a device which can provide an objective evaluation of the quality of leather samples is thus evident, especially in the field of military footwear where serviceability is a prime requisite.

The objects and advantages of the present invention are accomplished by a device which flexes a sample of leather by a predetermined amount and permits the counting of the number of wrinkles formed along a selected linear distance on the grain surface of the flexed leather sample.

A typical embodiment of the invention comprises means for holding flat a piece of leather, means for producing a concave depression of predetermined curvature in the grain surface of the piece of leather and means for determining the number of wrinkles per unit linear dimension formed by the flexure of the leather.

An object of the present invention is to permit an objective determination of the quality of various leathers.

Another object is to permit an objective standard to be set up whereby the quality of various leathers can be determined.

A further object is to permit the objective evaluation of the break characteristic of leather.

Yet another object is to permit the objective evaluation of the quality of leather samples by personnel untrained in judging such quality.

An additional object is to permit an objective evaluation of the quality of any leather to be made more rapidly, more inexpensively and more accurately by inexpert personnel than was previously possible by expert judges employed in the leather industry.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 1:
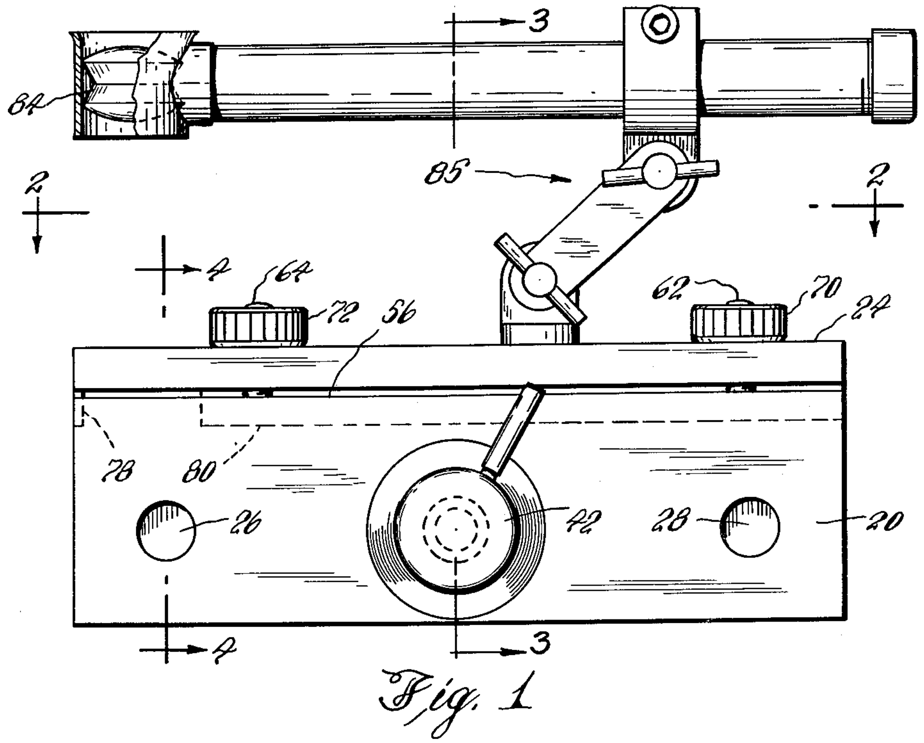
FIG. 1 is an elevational view of a leather break tester, showing preferred embodiment of the invention.
Figure 2:
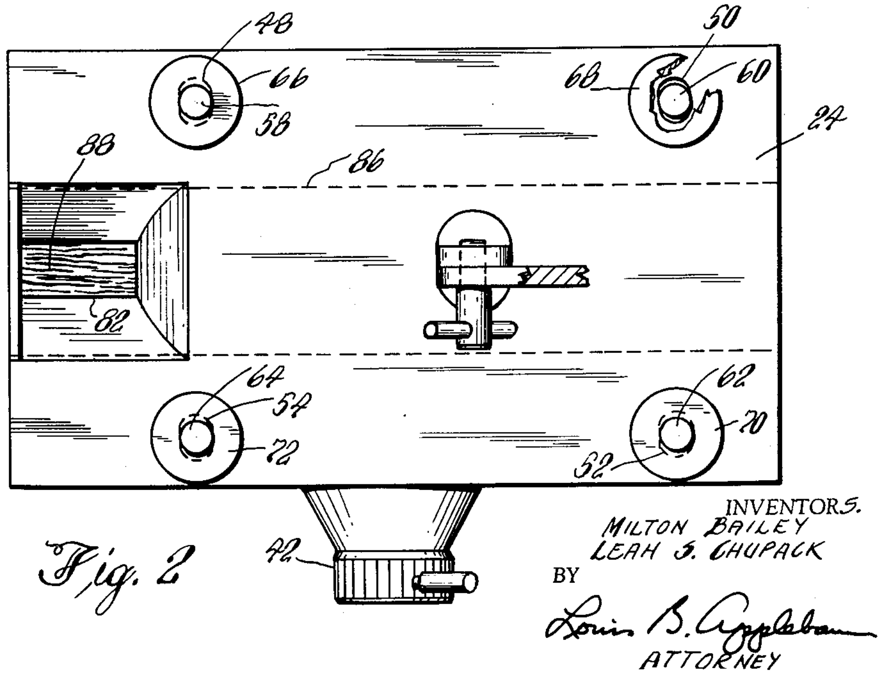
FIG. 2 is a plan view of FIG. 1, with the optical member removed.
Figure 3:
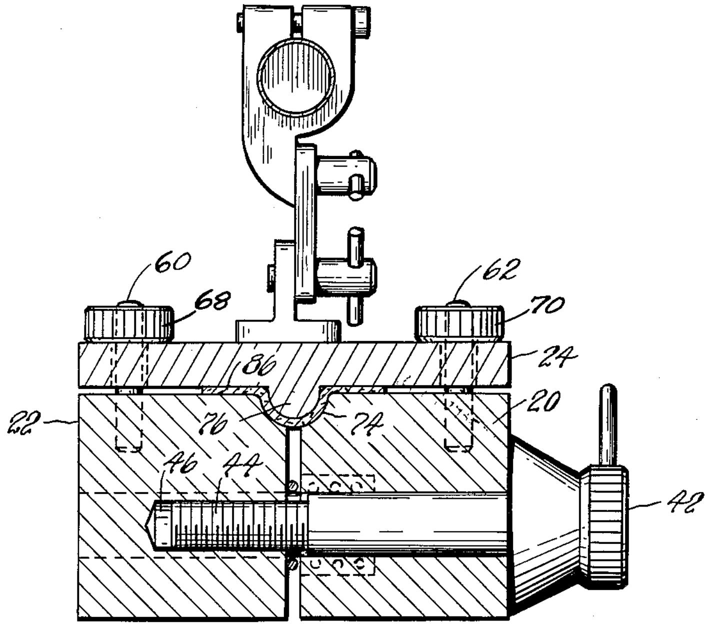
FIG. 3 is a cross-sectional view taken along the line 3—3 of FIG. 1.
Figure 4:
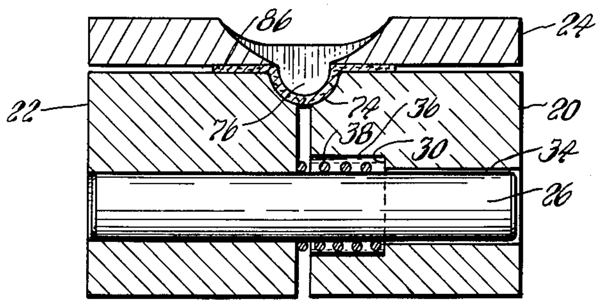
FIG. 4 is a cross-sectional view taken along the line 4—4 of FIG. 1.
Figure 5:
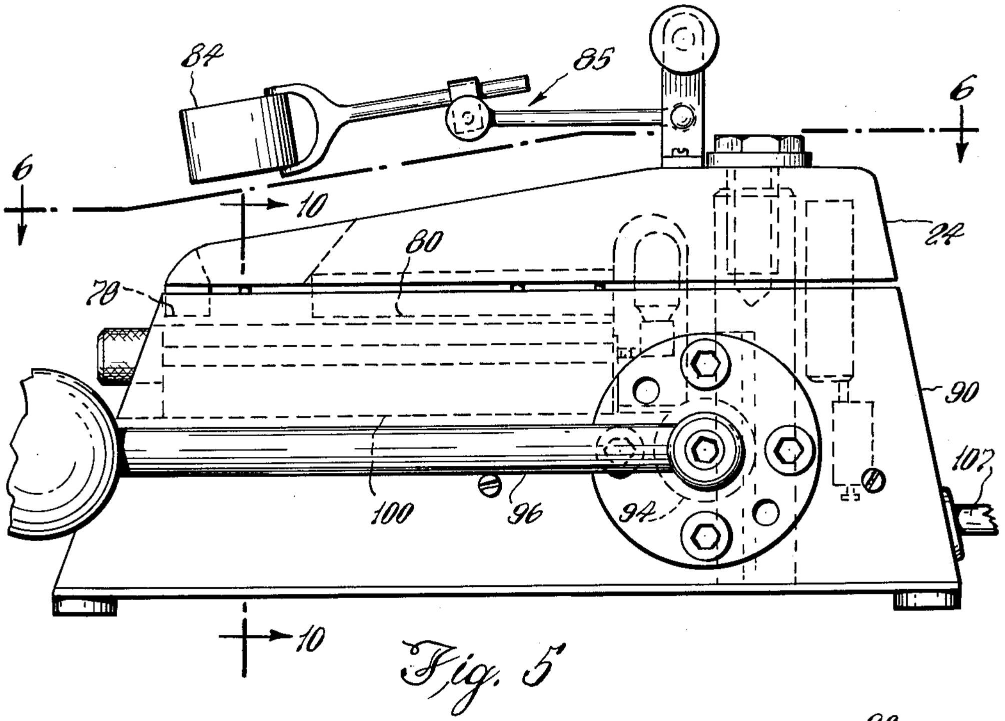
FIG. 5 is an elevational view of another preferred embodiment of the invention.
Figure 6:
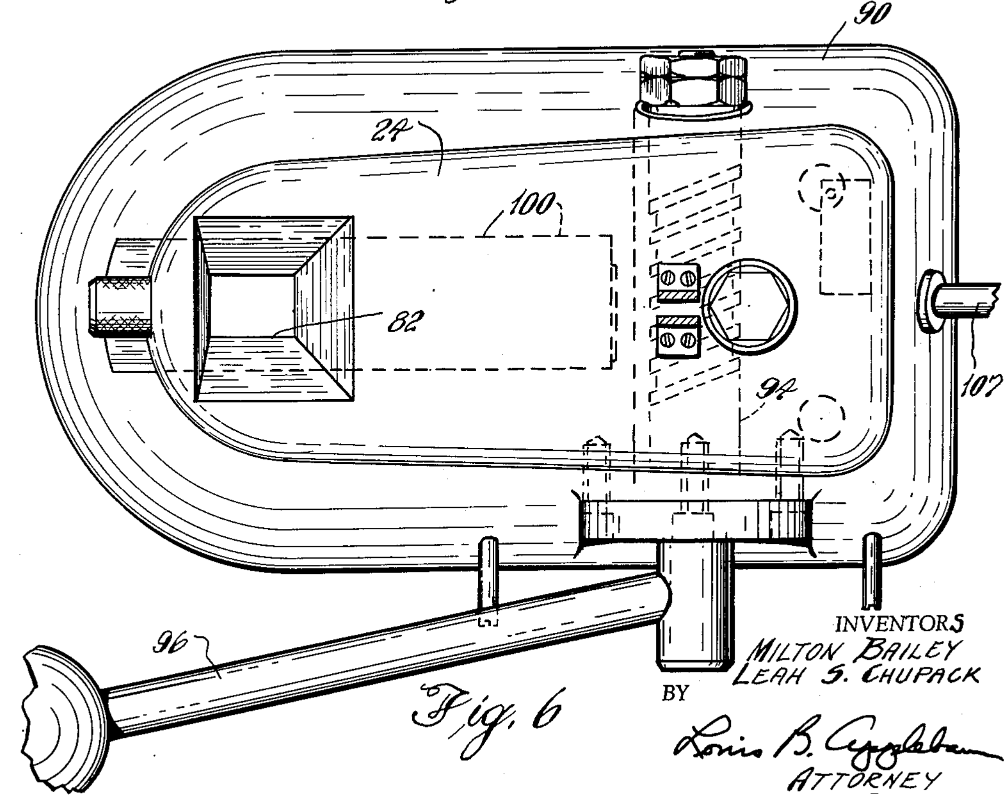
FIG. 6 is a sectional view along the line 6—6 of FIG. 5.
Figure 7:
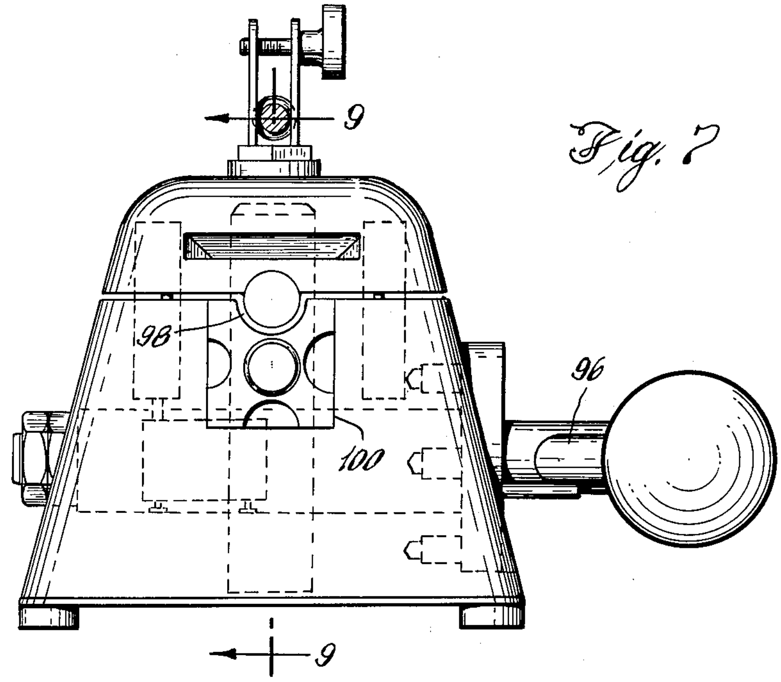
FIG. 7 is an end view of FIG. 6.
Figure 8:
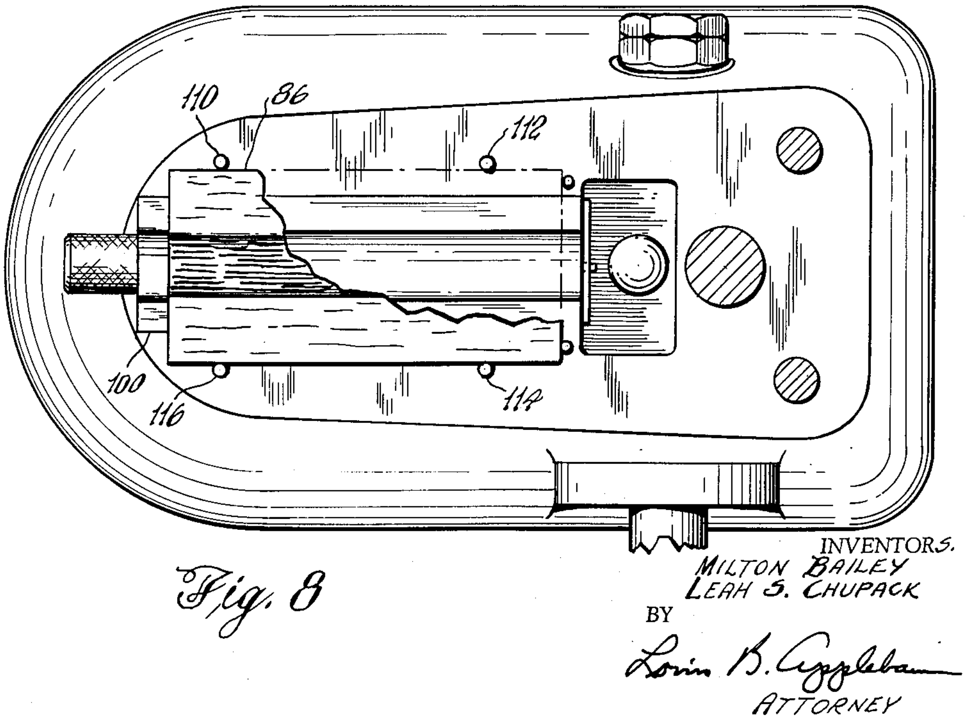
FIG. 8 is a plan view of the base member of FIG. 5 with a partially cut-away specimen of leather placed over the groove.

FIGS. 1 through 4 show front, top and sectional views of a first embodiment of the invention, which comprises a base member consisting of two independent sections 20 and 22 and a cover member 24. The base sections 20 and 22 fit together by means of a pair of dowel pins 26 and 28. The pins 26 and 28 are firmly retained in the rear base section 22 (see FIG. 4), the front base section 20 being free to slide along the pins 26 and 28 until the shoulder 30 between the two bores 34 and 36 contacts the spring 38. (The bores, shoulder and spring for the pin 28 are identical with those associated with pin 26.) The sections 20 and 22 can then be brought together by the exertion of a certain amount of pressure.

This pressure can be applied by means of a dial 42 mounted at one face of the front base section 20 on a screw member 44 which extends through the front section 20 and into a threaded bore 46 in the rear section 22. Turning the dial 42 one way brings the two base sections 20 and 22 together and turning the dial 42 the other way allows springs 38 and 40 to force the base sections 20 and 22 apart.

A cover plate 24 having four oval holes 48, 50, 52, 54 can be placed upon the top surface 56 of the base member which includes four posts 58, 60, 62 and 64 which fit through said holes in the cover plate 24. Four knurled nuts 66, 68, 70 and 72 are employed to fasten down the cover plate 24. The holes are oval in shape because the base sections 20 and 22 are movable and allowance must be made for the range of possible positions of the posts 58, 60, 62 and 64.

The upper surface 56 of the base sections 20 and 22 is cut away at the abutting surfaces to form a longitudinal groove 74 of curvilinear cross-section. The radius of the groove 74 can, in effect, be varied by altering the spacing between the front and rear sections 20 and 22 of the base member.

The cover plate 24 is formed with a longitudinal bar or mandrel 76 extending along its undersurface in line with the groove 74 when the cover plate 24 is placed in position over the posts 58, 60, 62 and 64. The radius of curvature of the mandrel 76 is smaller than the smallest radius attainable by the groove 74 or, in other words, the cross-sectional area of the mandrel 76 is smaller than that of the groove 74, so that the mandrel 76 always fits into the groove 74.

The mandrel 76 is formed in two sections 78 and 80 which have a space between them. Above this space between the mandrel sections lies a rectangular viewing slot 82 which has beveled sides on three sides. These beveled sides are darkened to improve viewing conditions.

An enlarging lens 84 is disposed above the viewing slot 82 by means of an adjustable mounting shown generally at 85. This mounting 85 is affixed to the top of the cover plate 24. Any suitable mounting can be employed.

In operation, a flat specimen of leather 86 is placed upon the upper surface of the base member over the groove 74. The cover plate 24 is placed upon the leather 86 and tightened down by means of the knurled nuts 66, 68, 70 and 72. The tightening process forces the leather 86 into the groove 74 due to pressure from the mandrel bar 76 and the leather specimen 86 is caused to fit tightly against the sides of the groove 74, thereby assuming its curvature. The radius of curvature of the groove 74 (or its cross-sectional area) can be adjusted in accordance with the thickness of the leather specimen 86 so that a proper fitting of the leather to the sides of the groove is obtained.

The flexing of the leather specimen 86 causes wrinkles 88 to appear in the upper surface of the leather. These wrinkles are generally longitudinal (parallel to the direction of the groove and mandrel) in direction and can be viewed through the viewing slot 82 and lens 84. The number of wrinkles per unit of linear dimension in a direction transverse to the direction of the groove 74 (or along the width of the slot 82) is a measure of the quality of the leather. Thus, to provide a linear scale for such counting, the width of the slot 82 may be a predetermined value or a calibrated scale may be mounted on the viewing lens 84.

For purposes of clarity, the leather specimen 86 is omitted from FIG. 1.

FIGS. 5 through 10 show various views of a preferred embodiment of the invention. In this embodiment, the base member 90 is a single unit. The cover plate 24 is mounted on a post 92 which extends down into a bore in the base member 90. The lower portion of the post 92 is geared and meshes with a worm 94 which is turned by means of an external lever 96. The cover plate 24 can be moved up and down by means of this worm gear arrangement.

The groove 98 in the upper surface of the base member 90 is now part of a removable rectangular bar 100 which contains four grooves 98 of increasing cross-sectional area, a different one extending along each of its longitudinal surfaces. The groove bar 100 can be slid into and out of its position within the base member 90. The four differently sized grooves 98 are substitutes for the adjustable groove of the previous embodiment.

Figure 9:
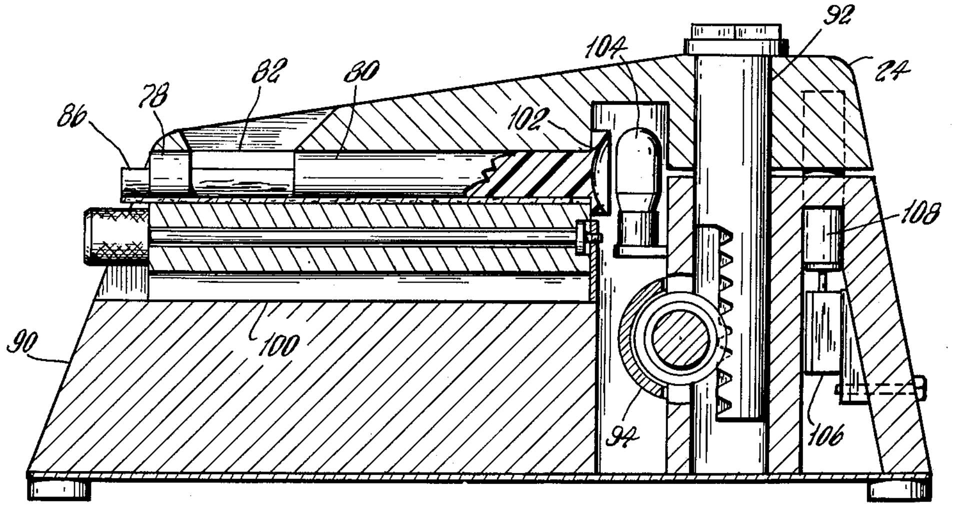
FIG. 9 is a sectional view taken along the line 9—9 of FIG. 7 with the addition of a specimen of leather in proper position.
Figure 10:
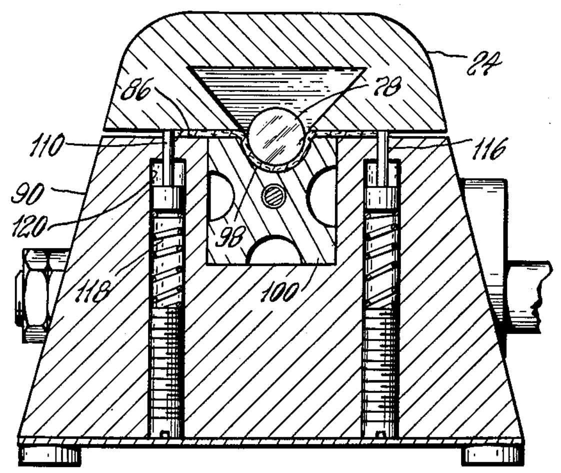
FIG. 10 is a sectional view taken along the line 10—10 of FIG. 5 with the addition of a specimen of leather in proper position.

The mandrel sections 78 and 80 are best indicated in FIG. 9. Mandrel section 80 is fabricated from a light-conducting plastic, such as Lucite, and carries a lens-shaped insert 102 at one end. The insert 102 concentrates light from a small lamp 104 situated within the device. The light is piped through the mandrel section 80 to illuminate the section of the leather specimen 86 which is visible through the slot 82 in the cover plate 24.

The lamp 104 is turned on by a microswitch 106 which is actuated by a piston 108. The piston 108 is affixed to the cover plate 24 and moves up and down in a bore in the base member 90 as the cover plate 24 is moved up and down. When the cover plate 24 is lowered sufficiently, the microswitch 106 is actuated. Power is supplied from an external source through a cable 107.

Four spaced pins 110, 112, 114 and 116 are employed as positioners for the leather specimen 86. These positioning pins rest upon springs 118 within cylinders 120 (see FIG. 10) and are forced downward by the descent of the cover plate 24 so that the lower surface of the cover plate 24 is able to make contact with the upper surface of the leather specimen 86. When the cover plate 24 is raised, the pressure of the springs 118 forces the positioning pins 110, 112, 114 and 116 up again.

An enlarging lens 84 is disposed above the viewing slot 82 by means of an adjustable mounting shown generally at 85. The mounting 85 is affixed to the top of the cover plate 24.

Obviously many modifications and variations of the present invention are possible in the light of the above teachings. It is therefore to be understood that within the scope of the appended claims the invention may be practiced otherwise than as specifically described.

We claim:

1. A device for evaluating the break characteristics of leather comprising in combination: mandrel-an-groove means for flexing a specimen of leather to form a wrinkled concavity in a surface thereof, some of said wrinkles being accessible to view; and means for facilitating the counting of the number of said wrinkles along a selected linear dimension.

2. A device as in claim 1, wherein said selected linear dimension is transverse to the direction of said wrinkles.

3. A device as in claim 2, wherein said concavity is formed to a predetermined degree of curvature.

4. A device for evaluating the break characteristics of leather comprising in combination: means for disposing a flexible specimen of leather in a flat position, said means having a flat surface with a groove formed therein; means for flexing at least a portion of said flat specimen of leather to form a wrinkled concavity in a surface thereof, some of said wrinkles being accesible to view, said flexing means comprising a mandrel for forcing a portion of said leather specimen into said groove; and means for facilitating the counting of the number of said wrinkles along a selected linear dimension.

5. A device for evaluating the break characteristics of leather comprising in combination: means for disposing a flexible specimen of leather in a flat position, said means having a flat surface with a groove formed therein; means for flexing at least a portion of said flat specimen of leather to form a wrinkled concavity in a surface thereof, some of said wrinkles being accessible to view, said flexing means comprising a mandrel for forcing a portion of said leather specimen into said groove; and means for facilitating the counting of the number of said wrinkles along a selected linear dimension transverse to the direction of said wrinkles.

6. A device for evaluating the break characteristics of leather comprising in combination: means for disposing a flexible specimen of leather in a flat position, said means having a flat surface with a groove formed therein; means for flexing at least a portion of said flat specimen of leather to form a wrinkled concavity of predetermined degree of curvature in a surface thereof, some of said wrinkles being accessible to view, said flexing means comprising a mandrel for forcing a portion of said leather specimen into said groove; and means for facilitating the counting of the number of said wrinkles along a selected linear dimension transverse to the direction of said wrinkles.

7. A device for evaluating the break characteristics of leather comprising in combination: a base member formed with a longitudinal groove therein, the cross-section of said groove having a predetermined radius of curvature; a longitudinal mandrel having a pair of spaced sections, said mandrel being arranged for movement into said groove and having a somewhat smaller radius of curvature than said groove so that at least a portion of a specimen of leather laid over said groove may be forced into said groove by the pressure of said mandrel and caused to assume the shape of said groove, the resultant flexing of said specimen causing wrinkles to form in the concave surface of said leather specimen lying in the space between said two mandrel sections; and means for facilitating the counting of the number of said wrinkles along a selected linear dimension transverse to the direction of said wrinkles.

8. A device as in claim 7, wherein said base member is comprised of two sections which fit together along the length of said groove, the spacing between said base sections being adjustable so that, in effect, the radius of curvature of said groove can be varied whereby leather specimens of different thicknesses can be forced into said groove.

9. A device for evaluating the break characteristics of leather comprising in combination: a base member having a flat surface formed with a longitudinal groove of curvilinear cross-section therein; a cover member adapted to be placed in pressured contact with the flat surface of said base member, said cover member bearing a mandrel-like, longitudinal element along its contact surface in such position that said mandrel-like element may be forced into said groove, the radius of curvature of the former being somewhat smaller than that of the latter so that a specimen of leather lying upon said flat surface of said base member over said groove may be forced into said groove by movement of said mandrel-like element and caused to assume the shape of said groove, whereby wrinkles are formed in the concave surface of said leather specimen, said mandrel-like element being formed of two spaced sections, said cover member being formed with an opening therethrough disposed in the space between said two sections of said mandrel-like element, whereby a portion of the wrinkled concave surface of said leather may be viewed; and means for facilitating the counting of the number of said wrinkles along a selected linear dimension transverse to the direction of said wrinkles.

10. A device as in claim 9, wherein said base member is comprised of two sections which fit together along the length of said groove, the spacing between said base sections being adjustable so that the curvature of said groove can effectively be varied whereby leather specimens of different thicknesses can be forced into said groove.

11. A device for evaluating the break characteristics of leather comprising in combination: a base member having a flat surface formed with a longitudinal groove of curvilinear cross-section therein; a cover member arranged to be moved into pressured contact with the flat surface of said base member, said cover member bearing a mandrel-like, longitudinal element along its contact surface in such position that said mandrel-like element may be forced into said groove, the radius of curvature of the former being somewhat smaller than that of the latter so that a specimen of leather lying upon said flat surface of said base member over said groove may be forced into said groove by movement of said mandrel-like element and caused to assume the shape of said groove, whereby wrinkles are formed in the concave surface of said leather specimen, said mandrel-like element being formed of two spaced sections, said cover member being formed with an opening therein disposed in the space between said two sections of said mandrel-like element, whereby a portion of the wrinkled concave surface of said leather may be viewed; and means for facilitating the counting of the number of said wrinkles along a selected linear dimension transverse to the direction of said wrinkles.

12. A device as in claim 11, wherein said base member is composed of two sections, one comprising a rectangular bar having four flat sides, each having a longitudinal groove of curvilinear cross-section therein, each of the four grooves having a different cross-sectional area, said bar fitting removably into an excised area in the other section of said base member so that all of said grooved sides may selectively be employed to form said flat surface of said base member.

13. A device as in claim 12, wherein the mandrel-like section which extends into the interior of said device is fabricated from light-conducting material, said device also including a lamp mounted adjacent to the internal end of said mandrel-like section, so that light from said lamp is conducted to the space between the mandrel-like sections to illuminate the wrinkled surface of said leather.

14. A device as in claim 11, wherein said base member is comprised of two sections which fit together along the length of said groove, the spacing between said base sections being adjustable so that, in effect, the curvature of said groove can be varied, whereby leather specimens of different thicknesses can be forced into said groove.

15. A device as in claim 14, where said means for facilitating counting of wrinkles comprises an enlarging lens.

References Cited in the file of this patent

UNITED STATES PATENTS

| | | |
|---|---|---|
| 14,421 | Erichsen | Jan. 8, 1918 |
| 1,695,367 | Collins | Dec. 18, 1928 |
| 2,645,937 | Skalmusky et al. | July 21, 1953 |
| 2,761,056 | Lazo | Aug. 28, 1956 |
| 2,817,232 | Flinn | Dec. 24, 1957 |

OTHER REFERENCES

Publication: Chemistry and Technology of Leather, vol. 1, O'Flaherty et al. (1956), Reinhold Pub. Corp., N.Y., page 435. (Copy in Scientific Library.)